United States Patent
Shuster (10) Patent No.: US 9,202,223 B2
(45) Date of Patent: *Dec. 1, 2015

(54) METHOD AND SYSTEM FOR TRANSACTING WITH NETWORK TRAFFIC

(75) Inventor: Gary Stephen Shuster, Fresno, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 872 days.

This patent is subject to a terminal disclaimer.

(21) Appl. No.: 12/788,830

(22) Filed: May 27, 2010

(65) Prior Publication Data

US 2010/0235234 A1 Sep. 16, 2010

Related U.S. Application Data

(63) Continuation of application No. 11/219,104, filed on Sep. 1, 2005, now Pat. No. 7,734,504, which is a continuation of application No. 09/837,719, filed on Apr. 18, 2001, now Pat. No. 6,978,252.

(60) Provisional application No. 60/198,492, filed on Apr. 18, 2000.

(51) Int. Cl.
| | |
|---|---|
| *G06F 21/00* | (2013.01) |
| *G06Q 30/02* | (2012.01) |
| *G06Q 20/10* | (2012.01) |
| *G06Q 20/20* | (2012.01) |
| *G06Q 40/04* | (2012.01) |
| *H04L 29/06* | (2006.01) |
| *H04L 29/08* | (2006.01) |

(52) U.S. Cl.
CPC ............... *G06Q 30/02* (2013.01); *G06Q 20/10* (2013.01); *G06Q 20/202* (2013.01); *G06Q 30/0246* (2013.01); *G06Q 30/0273* (2013.01); *G06Q 40/04* (2013.01); *H04L 29/06* (2013.01); *H04L 67/02* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 5,590,197 A | 12/1996 | Chen et al. |
| 5,602,905 A | 2/1997 | Mettke |
| 5,668,988 A | 9/1997 | Chen et al. |
| 5,717,860 A | 2/1998 | Graber et al. |

(Continued)

OTHER PUBLICATIONS

Past, present, and future office actions, amendments, arguments, and other possibly relevant documents or materials in the file history of co-pending U.S. Appl. No. 09/837,719, filed Apr. 18, 2001, entitled Method and System for Transacting With Network Traffic, which issued on Dec. 20, 2005 as U.S. Pat. No. 6,978,252.

(Continued)

*Primary Examiner* — Fateh Obaid
(74) *Attorney, Agent, or Firm* — Meyertons, Hood, Kivlin, Kowert & Goetzel, P.C.

(57) ABSTRACT

A system and method for using targeted network traffic as payment-in-kind in exchange for rights to anything that may be connected to a network, such as network-connected computer hardware and copyrighted software or content on such hardware, is disclosed. The method may be adapted for use with almost any product or service which may be tracked over a network. The system and method are for use with transactions between a user of a subject product or service and a provider of the subject product or service desiring to receive traffic to a target in exchange for it.

20 Claims, 3 Drawing Sheets

(56) References Cited

U.S. PATENT DOCUMENTS

| | | | |
|---|---|---|---|
| 5,799,284 | A | 8/1998 | Bourquin |
| 5,905,736 | A | 5/1999 | Ronen et al. |
| 5,935,207 | A | 8/1999 | Logue et al. |
| 5,948,061 | A | 9/1999 | Merriman et al. |
| 5,960,409 | A | 9/1999 | Wexler |
| 6,016,504 | A | 1/2000 | Arnold et al. |
| 6,029,141 | A | 2/2000 | Bezos et al. |
| 6,112,240 | A | 8/2000 | Pogue et al. |
| 6,243,750 | B1 | 6/2001 | Verma |
| 6,334,111 | B1 | 12/2001 | Carrott |
| 6,349,289 | B1 | 2/2002 | Peterson et al. |
| 6,519,596 | B1 | 2/2003 | Hoyt et al. |
| 6,584,500 | B1 | 6/2003 | Arkko |
| 6,584,504 | B1 | 6/2003 | Choe |
| 6,606,657 | B1 | 8/2003 | Zilberstein et al. |
| 6,704,787 | B1 | 3/2004 | Umbreit |

OTHER PUBLICATIONS

Dec. 29, 2003 Office Action in U.S. Appl. No. 09/837,719, filed Apr. 18, 2001.

Jul. 28, 2004 Office Action in U.S. Appl. No. 09/837,719, filed Apr. 18, 2001.

Mar. 21, 2005 Office Action in U.S. Appl. No. 09/837,719, filed Apr. 18, 2001.

May 17, 2005 Notice of Allowance in U.S. Appl. No. 09/837,719, filed Apr. 18, 2001.

White, Ron, "How Computers Work", Millenium Ed., Que Corporation, Sep. 1999.

Derfler, Frank J., et al. "How Networks Works", Millennium Ed., Que Corporation, Jan. 2000.

Gralia, Preston, "How the Internet Works", Millenium Ed., Que Corporation, Aug. 1999.

METHOD AND SYSTEM FOR TRANSACTING WITH NETWORK TRAFFIC

CROSS-REFERENCE TO RELATED APPLICATIONS

This application is a continuation of Ser. No. 11/219,104, filed on Sep. 1, 2005, which is a continuation of U.S. patent application Ser. No. 09/837,719, filed on Apr. 18, 2001 which is now issued as U.S. Pat. No. 6,978,252, which claims priority pursuant to 35 U.S.C. §119(e) to U.S. Provisional Application No. 60/198,492, filed Apr. 18, 2000, all of which are specifically incorporated herein by reference in their entirety.

BACKGROUND OF THE INVENTION

1. Field of the Invention

The present invention relates to methods and systems for transacting business, and more particularly to methods for enabling transactions in network traffic, including using traffic as payment-in-kind for software, hardware or other products and services that may be connected to a wide area network.

2. Description of the Related Art

The widespread availability of "free" services over publicly accessible networks, such as the Internet, both reflects and reinforces a widespread expectation that software (and by implication, the hardware that software runs on) be made available on public networks in exchange for something other than the payment of cash by the software end user to the software owner or licensee. This expectation is consistent with public expectations concerning proprietary material, such as copyrighted entertainment, offered over traditional broadcast media such as television or radio. According to the prevalent business model in broadcasting, the end user who receives and enjoys broadcast material pays nothing directly to the broadcaster or producer to defray their production and broadcasting expenses. Instead, these costs are primarily paid for by sponsors who purchase advertising time or space from the broadcaster. The sponsors, in turn, recoup their advertising costs from consumers who are at least in part induced to purchase goods or services from the sponsor as a result of advertisements.

A similar model is used in networked media. A network host defrays the costs of operating a website by selling advertising space to sponsors. Frequently, the host provides copyrighted content for free use or viewing to attract consumers to the host site, who view the advertising and thereby contribute to the creation of the valuable advertising space that is sold by the host to the sponsor.

The sponsor typically desires to asses the monetary value of the advertising time or space that it is purchasing. In broadcast models, this is often done through using sophisticated analytical and measurement tools to estimate the extent that advertisements are being viewed, and the extent to which the viewing of advertisements results in greater revenues to the sponsor. Similar tools may be employed in networked media; however, networked media affords the additional opportunity to directly measure "traffic" to a network target generated by a particular ad or web page. Traffic may be measured in various automatic ways, such as by counting "click-through" to the target. However it is measured, traffic essentially represents a direct measure of consumer interest in the target. Because it can be quickly and automatically determined, and represents a direct measure of consumer interest, the cash value of traffic is readily assessable. The source of traffic to a target is also readily and automatically determinable. For example, the traffic generated by a particular ad, such as a banner ad, may readily be determined. Accordingly, traffic can be bought, sold, exchanged for value, and otherwise used in business like any other commodity.

However, transactions in network media have not heretofore been able to take full advantage of the abundant opportunities that traffic as an exchangeable commodity offers. For example, most frequently, network media transactions merely mimic the classic media model whereby a sponsor pays cash in exchange for advertising space (such as a banner ad) on a web server. For further example, slightly more sophisticated transactions include those, such as a free web hosting service, wherein rights to use a network resource are exchanged for a right to occupy viewing space on a user's view screen with banner ads and similar traffic-generating objects. In a free host service, the user (typically, an individual consumer) does not pay for the right to connect to and access the network through a host server. Instead, the user grants the host server the right to insert advertising on the user's viewing screen. In other words, the right to occupy space on the user's view screen supplants cash as payment-in-kind.

In both of the foregoing examples, it is advertising space that is exchanged, not traffic itself. However, traffic is a more desirable and more valuable commodity, because it is more closely related to the desired end result (namely, increased sales by a sponsor) than is advertising space. Furthermore, exchanges of advertising space suffer from several limitations. For example, free host servers typically configure the user's interface so that a substantial portion of the view screen is always occupied by the host's advertising. This is obtrusive and substantially reduces the user's usable viewing area, making the free host service less desirable and less likely to attract the more desirable users, that is, those who can afford to pay for network access without giving up viewable area. In general, the effectiveness of advertising on the Internet has come into question, and is frequently not as effective as desired. Furthermore, exchanges of advertising space are more limited in applicability than exchanges of the more fungible and liquid traffic would be, if only a system and method were available to make such transactions feasible.

It is desired, therefore, to provide a system and method whereby traffic (and not merely advertising space) may be exchanged for a property right, such as a license to use or an ownership right to network-connected devices and to copyrighted content on such devices.

SUMMARY OF THE INVENTION

The present invention provides a system and method for transacting with targeted network traffic, including using such traffic as payment-in-kind for rights to anything that may be connected to a network. Such network-connected things include, of course, network-connected computer hardware, copyrighted software, or other electronic content. The day is fast approaching that almost any article of commerce can be made network-connectable by incorporation of an inexpensive remote communication device, and almost every transaction involving a good or service involves at least the recording of the transaction in a network-connectable device. Accordingly, the present invention in one of its various embodiments is believed to be applicable to an almost unlimited range of transactions.

The method according to the invention is for use in a transaction between a user of a subject product or service and a provider of the subject product or service desiring to receive traffic to a target in exchange for it. The method may be generally described as follows. The user is capable of generating network traffic to the target, and is accordingly referred to herein as a "traffic generator." The subject product or service, herein referred to as the "subject," is connected to a network. A traffic destination designated by the provider, such as a web page or web site, herein referred to as a "target," and an application for performing steps of the method, herein referred to as a "traffic manager" are also connected to the network. The traffic manager may be incorporated into the subject (for example, if the subject comprises a web site), or may reside in a separate device. The traffic manager is configured to receive state information from the subject, and particularly, information about the state of use of the subject, such as the extent and manner to which the subject has been used or consumed, and to correspondingly debit a traffic generator account an amount depending on its state of use. The traffic generator is provided with a unique redirection code, and causes requests containing the redirection code to be directed to the traffic manager. For example, the traffic generator may erect a web site containing selectable links that, when selected by someone browsing the web site, send a request containing the redirection code to the traffic manager. The traffic manager is further configured to receive requests over the network. When the traffic manager receives a request containing a redirection code, the traffic manager redirects the request to the target, and credits a traffic generator account an amount depending on how the traffic to the target is measured. The traffic manager retains the traffic generator account information for use by the sponsor and traffic generator. A system according to the invention comprises the traffic manager operatively incorporated in a network-connectable device.

The operation of the method may be enhanced by many optional steps depending on the specific application. In an embodiment of the method, the traffic generator takes a pre-determined action when the traffic generator account achieves a certain state. For example, if the credits to the account are too low relative to the debits, causing the generator account to fall below a predetermined level, the traffic manager may instruct the subject to change its operating state. For example, if the subject is a powered device, the subject may be instructed to power down or enter a suspended (generally non-operative) state until otherwise instructed by the traffic manager. For applications where the subject is capable of generating traffic, such as when the subject is a web host or web site, the subject may be instructed to generate more requests containing the traffic generator's redirection code. This may be accomplished, for example, by increasing the number of selectable links on a web site that will cause a request containing the redirection code to be generated, or by randomly selecting and inserting a redirection code in a proportion of all requests generated by the web site. Furthermore, the traffic manager may take different actions at different account levels. The traffic manager may additionally take certain other actions, such as generating an account statement, at predetermined times.

In another embodiment of the invention, the traffic manager is configured to receive traffic information from the target and use such information in determining how the traffic generator account is to be debited. For example, greater credit could be awarded for traffic that is associated with certain actions taken at the target site, and particularly, sales initiated at the target site from traffic generated by the traffic generator. Such steps are useful for encouraging the traffic generator to direct high-quality, profitable traffic to the target, instead of merely a large number of "clicks."

The following exemplary applications of the method according to the invention illustrate the operation of the method. In a first exemplary application, the subject comprises software or other copyrighted content for use on a web server, and the traffic manager is incorporated as a module or component of the subject. The traffic generator installs and uses the subject software on a web server in exchange for traffic to be directed to the sponsor thereby, and the subject software is pre-configured (or is configured by the traffic generator) to generate traffic containing a redirection code, such as "http://site/redir.dll." All requests from the web server are routed through the traffic manager, which redirects traffic containing the redirection code to a target specified by the sponsor. The traffic may be redirected by a server-side redirection command, or less preferably, a client-side meta refresh command. The traffic manager increments a counter (that is, the traffic generator account) by some number of units each time a request is received. The counter is decremented for each request without a redirection code, and incremented for each request with a redirection code. If the counter falls below a pre-determined level (such as zero), the next request received by the traffic manager, whether or not it contains a redirection code, is redirected to the target. Alternatively, some set proportion of incoming requests are directed to the target. Either way, the sponsor is assured a minimum proportion of traffic from the web server running the subject server.

In a related second exemplary application of the method, the traffic manager comprises a first component that is installed as a filter on a web server of the traffic generator, and a second component that functions as the traffic generator account manager that is installed at some other network location. The subject software is installed on the web server, and all of the web server traffic is routed through the filter. Multiple web servers with multiple filter components may be connected to the same account manager component. Periodically, the filter component contacts the account manager component and, using a password encrypted protocol, exchanges account information with the account manager. Depending on the status of the generator account, the manager component instructs the subject software as described in the first exemplary application.

In a third exemplary application, the subject comprises a tangible or intangible product or service that is unrelated to a web server, such as, for example, a downloadable music file, a beverage served by a restaurant chain, or a discount to an amusement park. In the case of the downloadable file, the necessary network connectivity may be provided by an imbedded executable routine in the file and/or the web server that the file is downloaded from. In the case of a product such as a beverage or a discount admission, the connectivity may be provided by a point-of-sale device, such as a network-connected cash register or turnstile. The traffic generator desires to make the subject product available to its subscribers at the sponsor's expense, in exchange for generating traffic to the sponsor's site. The traffic manager is installed at a separate network location. The traffic generator causes selectable links to be erected anywhere on the network which will direct requests containing the redirection code to the traffic manager. The links may be erected on a page offering the subject product to the subscribers, or in a separate, unrelated location. Each time the subject product is used (for example, each time the file is downloaded or played, or each time a point-of-sale event is registered), the traffic manager receives notification over the network, and adjusts the generator account accordingly. For example, if the subject product is a beverage, provision of the beverage may conditioned on entry of an acceptable code (such as a coupon code) into a point-of-sale device.

The point-of sale device tracks information regarding such coded transactions and relays the information to the traffic manager. If insufficient traffic is generated to compensate the sponsor for the cost of the subject product, the traffic manager may take certain actions, such as invoicing the traffic generator for any shortfall. The generator may then respond by generating additional traffic or by paying the invoice. In the alternative, or in addition, the traffic manager may prevent any further downloading of the file or dispensing of coupons for the subject, or if necessary, cause any unredeemed coupons or unused files to become unusable by communicating with the appropriate point-of-sale devices or downloaded files.

A more complete understanding of the method and system according to the invention will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method and system for transacting with network traffic, including using traffic as payment-in-kind for anything that may be connected to a network. The method and system is particularly useful for enabling payment-in-kind for network resources, such as server space, network connections, and browser applications, where the subject itself may be used as a tool to generate network traffic. However, the invention is not so limited and may be used with virtually any product or service capable of being connected to a network to enable its exchange for network traffic to a specified target.

Figure 1:
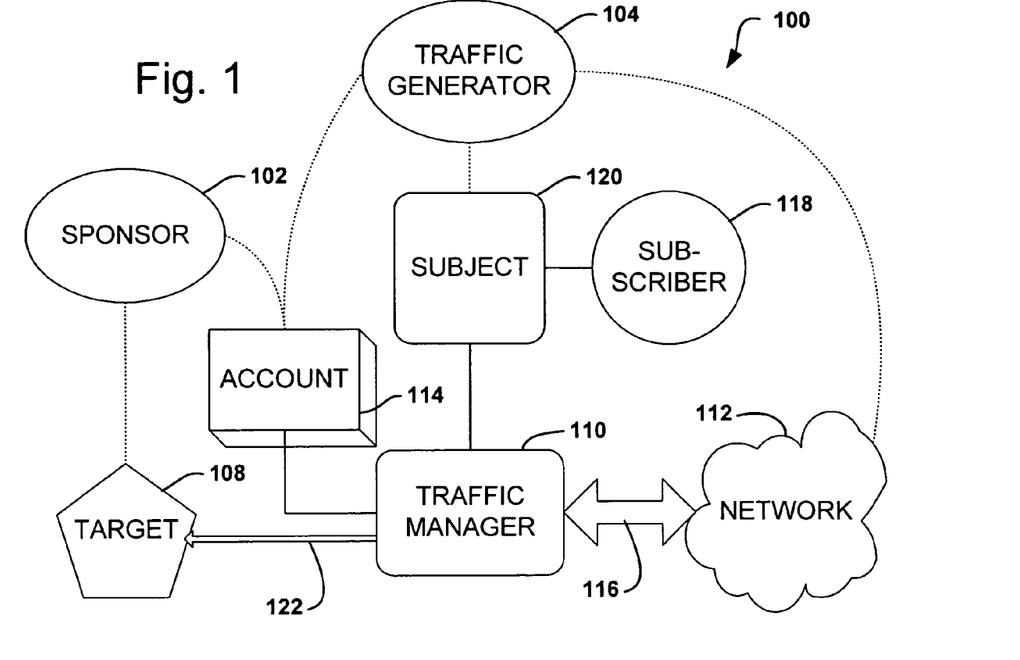
FIG. 1 is a block diagram showing exemplary relationships between objects of a system according to the invention.

FIG. 1 shows a system 100 of objects capable of performing a method according to the invention. It should be appreciated that additional objects and elements may be present, and certain of the objects and elements of system 100 may be omitted, without departing from the scope of the invention.

The transacting parties, sponsor 102 and traffic generator 104, may be any persons or entities desiring to engage in a transaction whereby traffic is exchanged as payment-in-kind for a product or service. The sponsor 102 desires to direct network traffic to target 108. The sponsor's interest in directing traffic to target 108 may be for any number of reasons. For example, target 108 may advertise or take orders for products or services offered for sale by the sponsor. Alternatively, the sponsor may be selling advertising space on the target to other purveyors of goods and services.

Conversely, the traffic generator 104 desires to have or make use of the products offered by the sponsor, and is in a position to generate traffic directed to a target specified by the sponsor 102. Generally, a traffic generator is an operator of a web site, or producer of a web page or set of web pages, which attracts viewers or subscribers and which contain a link or links for directing viewers to the target site. However, it should be understood that the invention does not concern the exchange of a link or space on a web page or web site for anything of value, and that web pages or web sites with links are not a necessary element of the system or method. To the contrary, the invention is not concerned with how the traffic is generated. It is not even required that the traffic generator be connected to the network, so long as the traffic generator is capable of causing other network users to direct requests towards a specified target.

Although any entity with something of value to exchange for traffic may play the role of the sponsor 102, sponsors that have produced (or otherwise own) software or network-distributable content may find the invention particularly valuable, because such products may be of particular interest to parties positioned to generate large quantities of traffic, such as web portals or hosts. Furthermore, network resources (including, for example, software, electronic content, and network hardware) are readily connected to a network and can be configured to exchange information with other network devices. In addition, a network resource (for example, a web site) may readily be configured such that the extent to which a network resource is used is related to the traffic generated thereby, in a sense providing an opportunity for the resource to "pay its own freight." Each of the foregoing factors favors exchange of traffic for network resources, but does not preclude the exchange of other products or services, or even of cash, for traffic.

As transacting parties, the sponsor 102 and traffic generator 104 are not themselves operative elements of the system. Instead, the sponsor 102 and generator 104 may directly or indirectly influence other objects of the system, as indicated by the dotted lines shown in FIG. 1. Sponsor 102 is concerned with traffic to target 108. Target 108 may comprise any kind of content, file, or device that is accessible to users over a network and for which activity may be measured. Target 108 is typically a network location or address containing a viewable file, such as an HTML file or media file, designated and controlled by the sponsor. Various methods are known in the art for measuring the activity of such files, as described below in connection with FIG. 3. Preferably, the sponsor can change the content or address of the target at any time during the transaction, such as by appropriately instructing the traffic manager 110.

The sponsor 102 and the traffic generator 104 are both concerned with the status of account 114, as indicated by the dotted lines between them and the account. However, their relationship to account 114 is preferably an informational relationship only. That is, neither sponsor 102 nor generator 104 should be permitted to directly alter the value of account 114, as the value of the account should depend on extrinsic measures that are normally set by agreement between the sponsor and the traffic generator. Account 114 is a file or other record of traffic 122 caused by the traffic generator to the target, in relation to the state of use of the subject 120. It should be appreciated that target 108 may receive other traffic not as a result of any activity by the traffic generator, and such other traffic need not be, and preferably is not, reflected in the status of account 114.

The traffic generator 104 has further indirect relationships with the subject 120 and generally with users connected to system 100 via network 112. These indirect relationships are again indicated by dotted lines in FIG. 2. Typically, the traffic generator 104 receives some economic benefit from its relationship to the subject 120. Furthermore, in many applications the generator is also interested in a measured state of use of subject 120, which may change over time. However, in other applications, the subject's use state may be static. Also, the traffic generator typically has the power and right to alter the operation of subject 120, for applications where the subject operation can be altered. Each of the foregoing relationships between the subject 120 and the traffic generator 104 reflects a master-subject relationship, i.e., a relationship of voluntary power on the part of the generator and passive reaction by the subject. However, subject 120 exists independently of generator 104, and need not require any action on the part of generator 104 to operate as intended.

The traffic generator 104 also has a causal influence generally over some users of network 112, and so is capable of causing traffic 116 (that is, requests for information) to be directed to traffic manager 110 from network 112. Generator 104 is also capable of causing at least a portion of the requests directed to the traffic manager to contain a predetermined redirection code. Various different methods as known or as may be devised may be used to cause traffic to flow to manager 110, and system 100 is not limited by the method of causation employed. An exemplary method of causing traffic to flow in the direction of a specified location is to erect a web page containing a routine for generating a request to the traffic manager. When the routine is activated, for example, by selecting a link, closing or opening a window, or after a specified number of clicks, a request containing a redirection code is sent to the traffic manager. In the alternative, such as, for example, when the traffic generator has a number of network clients as subscribers, each subscriber's client device may be configured to send all requests to the network through the traffic manager. Further, each device may be configured to send a request containing a redirection code when specified events occur at a client device, such as, for example, after specified periods of inactivity. It should be appreciated that any method of causation may be used without impairing the operation of, or departing from the scope of, the invention.

Traffic manager 110 is at the hub of system 100, receiving and redirecting traffic to target 108, measuring the redirected traffic 122, monitoring and optionally changing the state of subject 120, and updating account 114. Hence, traffic manager 110 is a critical and enabling component of system 100. Once initialized, the traffic manager may function independently of the sponsor 102 and traffic generator 104 to operate system 100 until terminated by occurrence of a predefined event. Traffic manager 110 comprises a functional unit that may reside in a single application or device, or in the alternative, may be distributed across multiple applications or devices.

Figure 3:
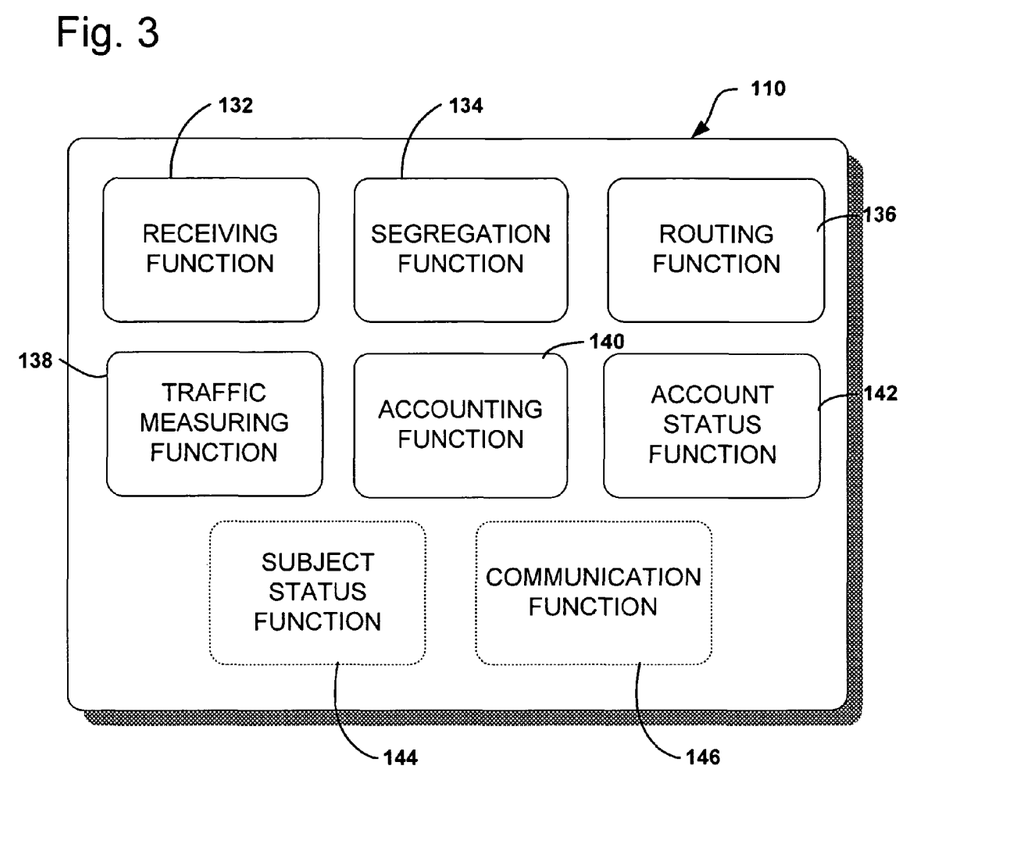
FIG. 3 is a block diagram showing exemplary functional modules of a traffic manager application according to the invention.

However the functionality of manager 110 is achieved, it should be configured to have capabilities as shown in FIG. 3. It should be capable of independently and continuously receiving separate information requests (traffic) that are addressed to it, i.e., capable of performing a receiving function 132. It should be capable of identifying or otherwise determining which of the requests that it receives are to be redirected to the target, i.e., capable of performing a segregation function 134. It should be capable of redirecting requests that are to be redirected, and letting other requests that it receives continue to their intended destination, i.e., capable of performing a routing function 136. It should be capable of counting or otherwise measuring the requests that are redirected to the target, i.e., capable of performing a traffic measuring function 138. It should be capable of maintaining an account reflecting the measured value of redirected traffic in relation to a static or dynamic subject value, i.e., capable of performing an accounting function 140. It should be capable of monitoring the status of the account and determining when account-based actions are triggered, i.e., capable of performing an account status function 142. Optionally, it should be capable of measuring use or consumption of a subject and determining a quantified status for use in its accounting function, i.e., it should optionally be capable of performing a subject status (value-measuring) function 144. Also optionally, it should be capable of communicating trigger messages to other objects or elements of system 100 when account 114 reaches predetermined trigger states, or at predetermined times, i.e., it should optionally be capable of performing a communication function 146. Traffic manager 110 may be provided with functions in addition to these, but the foregoing functions comprise a core that will be present in preferred embodiments of the invention. One skilled in the art of computer programming will appreciate various ways, in view of the present specification, to implement the foregoing core functions depending on the computing and network environment that the traffic manager will reside in.

Within the framework of a preferred traffic manager 110, a great deal of flexibility is possible. In an embodiment of the invention, all of the functional modules of the traffic manager reside in a single application at single network address. In an alternative embodiment, the receiving function 132, segregation function 134, the routing function 136, and traffic measuring function 138 are bundled together as a server-side or client-side application. Multiple copies of the client/server application are then distributed as desired to different network locations. The remaining modules are placed in an accounting/control module at a single location. Each of the distributed client/server applications communicates traffic information to the accounting module, preferably using an encryption protocol. This distributed embodiment facilitates the measurement and control of a large, nearly unlimited amount of traffic while causing minimal disruption to traffic flow patterns. It may therefore be preferred for larger transactions which justify its greater complexity.

Referring again to FIG. 1, critical relationships are provided between traffic manager 110 and other elements of system 100, as follows. Traffic 116 from network 112 is routed through the traffic manager. Most of this traffic may be routed back to its original destination address, as indicated by the double-headed arrow symbolizing traffic 116. At least a portion 122 of the traffic 116, however is redirected to target 108 by the traffic manager 110, as instructed by sponsor 102. It should be apparent that multiple targets may be specified by the sponsor, with one of the specified targets being selected for each redirected request. The chosen target may be selected at random from a list, may be selected according to the time of the request, based on routing information, or on some other parameter. Each time a request is redirected, the traffic manager is configured to increment a counter. In addition, the traffic manager may be configured to record information for, and calculate a "weight" for each click, based on information such as, for example, the amount of time since the prior click from the same unique IP address/browser combination or from addresses on the same subnet, an "http referrer" variable, or some other criteria. Optionally, the traffic manager may be configured to receive information from the target 108 about post-click events, such as whether a new prospect was registered or a sale occurred as a result of the click. Using the foregoing information, the traffic manager computes a measurement value for traffic directed to the target according to a method agreed upon by the sponsor and the traffic generator. The measured traffic value is then accumulated in account 114 as a credit to the account.

Optionally, the traffic manager communicates with subject 120 to receive state information and/or provide operating instructions to the subject. In some embodiments, subject 120 may comprise an application or device that is used by one or more subscribers 118. The traffic manager may collect information about the extent to which subject 120 is used by the subscribers, and debit account 114 as agreed by the sponsor and traffic generator. For example, if subject 120 comprises a web hosting service, the bandwidth consumed by the service may be integrated over time, and the integral of the bandwidth used as a basis for debiting account 114. Any method may be used to calculate the debits to account 114, without departing from the scope of the invention. According to some embodiments, account 114 is never debited, because the subject value is constant, as in a straight purchase of traffic for cash.

Additionally, traffic manager 110 may be configured to communicate instructions to change the state of subject, depending, for example, on the status of account 114. This functionality may be particularly useful when the subject is configured to direct traffic to the traffic manager, as discussed below in connection with FIG. 2. For other applications, the communication function 146 may be used for implementing the terms of an agreement between the sponsor and the traffic generator. For example, if traffic generated is insufficient to "pay" for the use of the subject, the traffic manager could instruct the subject (preferably after a suitable warning period) to power down. For further example, the subject could be instructed to enable additional features for subscribers after predefined traffic levels are obtained.

Figure 2:
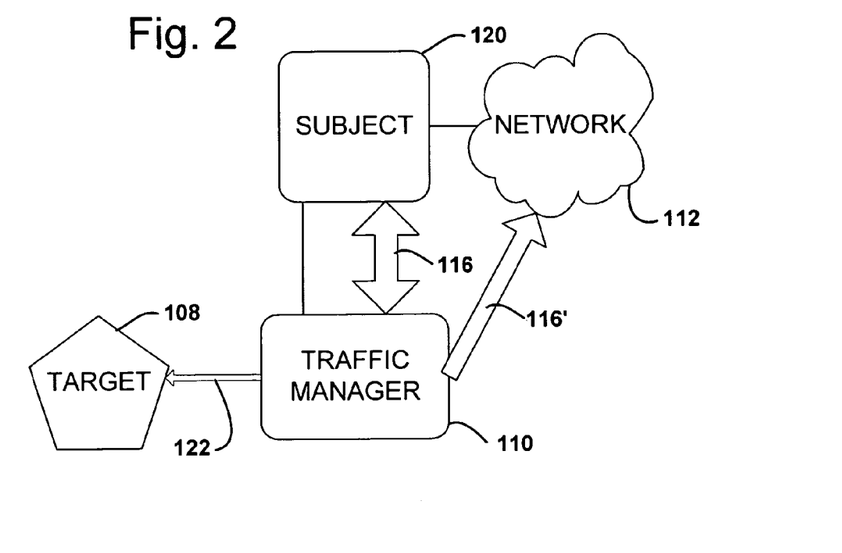
FIG. 2 is a portion of a block diagram showing an alternative portion of the system shown in FIG. 1.

In an embodiment of the invention, subject 120 is configured to direct traffic 116 directly to traffic manager 110, as shown in FIG. 2. For example, the subject 120 may comprise a web host that incorporates the traffic manager 110 as an internal module. The web host passes all traffic 116 generated by the host "through" the traffic manager 110, and the traffic manager is configured to redirect all requests bearing a redirection code as redirected traffic 122 to target 108. The non-redirected traffic 116' is passed to its ultimate address network 112. The other elements of system 100, which are not shown in FIG. 2, remain essentially the same as shown in FIG. 1.

The embodiment shown in FIG. 2 is particularly useful because the subject 120 (e.g., a web host) is configured to cause a selected portion of traffic 116 to contain a redirection code. If redirected traffic 122 is insufficient to maintain the status of account 114, the traffic manager notifies the subject, which causes a greater portion of the traffic 116 to contain the redirection code. This may be done any number of ways, for example, by increasing the number of links generating a redirection code, replacing the regular web pages with special promotional pages containing more redirection links, or inserting a redirection code in randomly selected requests. In the alternative, the traffic manager 110 can redirect a selected portion of traffic 116 to target 108, even if the traffic does not contain the redirection code. The increased redirection need not occur all at once; it may be sufficient to accomplish a slight increase in the redirection rate. However the increase in redirected traffic is accomplished, the sponsor can thus be assured at least a minimum amount of traffic as compensation for sponsor's costs of sponsoring the subject 120.

Figure 4:
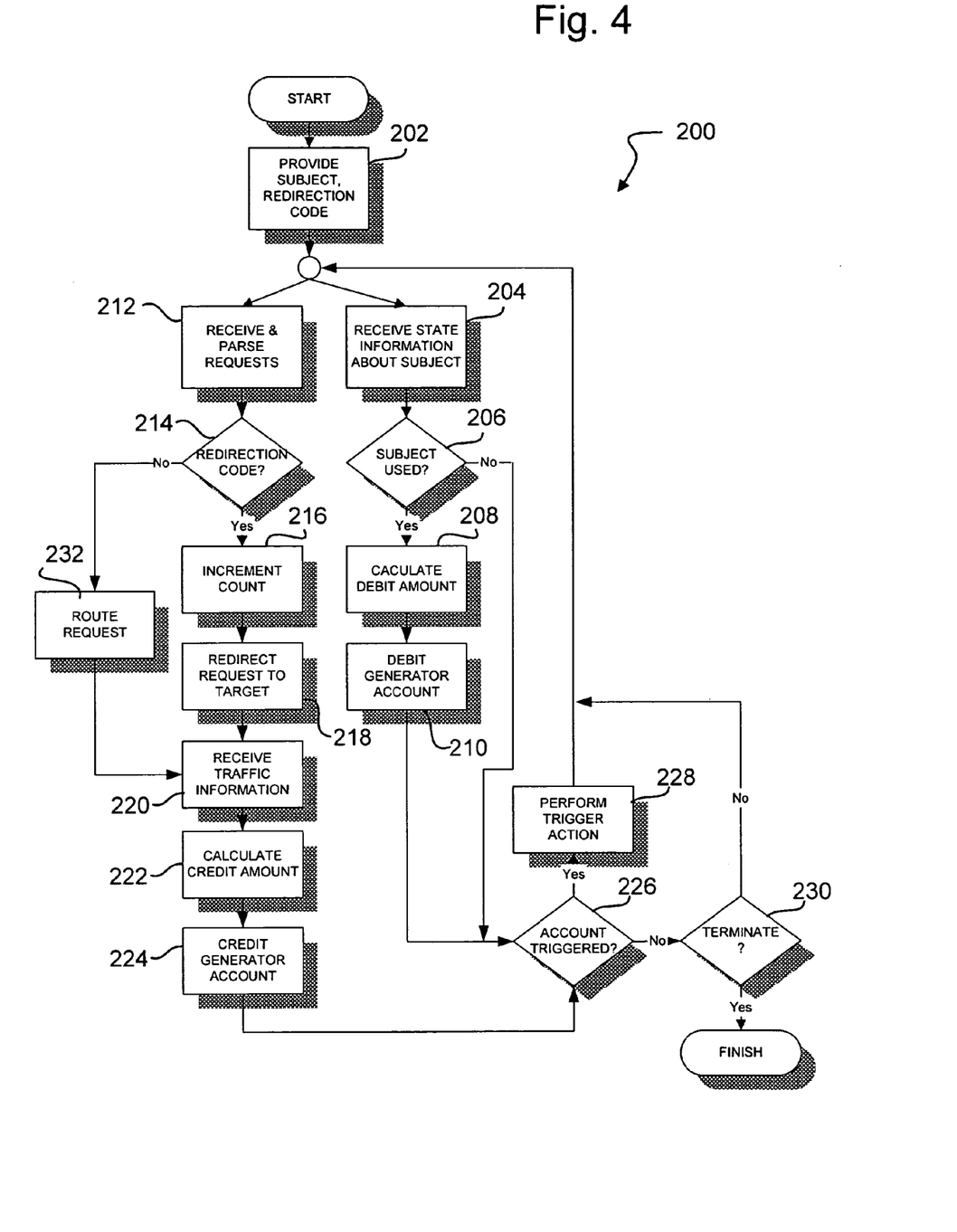
FIG. 4 is a flow diagram showing exemplary steps of a method according to the invention.

Exemplary steps of a method 200 according to the invention are shown in FIG. 4. At step 202, a subject of a transaction is provided, as previously described. A redirection code is also designated. In an embodiment of the invention, the redirection code designates an executable program module, such as a dynamic link library ("DLL") file. When the redirection module is called, a sequence of redirection steps may be carried out by the designated program module. Various other methods may be used to redirect traffic, as should be appreciated by one skilled in the art. Any method that is capable of placing a unique flag on a request and calling a redirection routine when the flag is recognized at a step of a routing process may be adapted for use with the invention.

After step 202, the process enters a parallel mode, with process branches beginning at steps 212 and 204, respectively, preferably executing in parallel. At step 212, network requests for information are generally received, such as by a traffic manager application, and parsed for the presence of a redirection code. If no redirection code is present, the request is routed to its destination as indicated at step 232. If a redirection code is present, a traffic measurement counter is incremented an amount at step 216. As previously described, the amount of increment, i.e., the value or weight assigned to each redirected request, may depend on various different criteria. The request is redirected to a specified target at step 218. At optional step 220, further information for weighting the value of the traffic is received back from the target. If desired, this information can be used to alter the value of the increments counted at step 216, or to otherwise adjust the account of the traffic generator. At step 222, a credit amount is calculated based on the counter value and/or the traffic information received at step 220. At step 224, the traffic generator account is credited the amount calculated at step 222.

In a parallel process beginning at step 204, state information is received about the subject. In the simplest case, the state information comprises an initial account value, e.g., a monetary value, that remains static. In many preferred embodiments, however, the state information includes a record of use since the last time the state information was received. "Use" may be measured in various different ways depending on the nature of the subject, of which examples have already been provided. If, at decision step 206, the state information indicates that the subject has been used or consumed in some way, then a debit amount is calculated at step 208, according to a predetermined formula. Again, the formula used will depend on the nature of the transaction and the agreement between the sponsor and the traffic generator. Then, at step 210, the generator account is debited the amount calculated at step 208.

The parallel process branches converge again at step 226. Periodically, or upon occurrence of predetermined events, a status monitoring function checks the status of the generator account. If the generator account values achieve predetermined trigger levels, then a predetermined trigger action is performed at step 228. Examples of possible trigger actions, such as instructing a capable subject to direct more traffic towards the target, have been provided in the foregoing description. If no trigger event is indicated at step 226, then so long as the transaction remains active (Le., the process is not to be terminated), the process loop continues at steps 212 and 204.

Having thus described a preferred embodiment of a method and system for securing payment in kind for network-connectable products and services, it should be apparent to those skilled in the art that certain advantages of the within system have been achieved. It should also be appreciated that various modifications, adaptations, and alternative embodiments thereof may be made within the scope and spirit of the present invention. For example, methods and systems for use with the Internet and Internet-connected devices have been illustrated, but it should be apparent that the inventive concepts described above would be equally applicable to other networks. For further example, use of the method to enable payment-in-kind transactions have been illustrated, but it should be apparent that the inventive concepts described above would be equally applicable to a transaction wherein traffic is exchanged for cash. The invention is further defined by the following claims.

What is claimed is:

1. A method comprising:
receiving, by a computer-based device, data encoding state information from a network-based product or service, wherein the network-based product or service is in networked communication with the computer-based device, wherein the network-based product or service corresponds to a network resource for a web page or web site, and wherein the state information is indicative of a usage of the network-based product or service by a user;
detecting, by the computer-based device, that a link displayed by a web browser has been selected by the user to request use of the network-based product or service;
based on the state information and detecting the request, the computer-based device determining a debit amount associated with the request to use the network-based product or service;
receiving, by the computer-based device, an indication that network traffic to a designated web-based target has been generated by the user;
calculating, by the computer-based device, a credit value for the user, wherein the credit value is associated with the network traffic generated by the user, and wherein the credit value is usable for the user to use the network-based product or service; and
determining, by the computer-based device, whether to grant the request to use the network-based product or service, wherein the determining is based on a comparison of the credit value usable for the user to use the network-based product or service to the debit amount.

2. The method of claim 1, further comprising:
upon determining that the request is not granted, the computer-based device modifying source code corresponding to the link to incorporate source code corresponding to an additional link selectable by the user to navigate to a particular designated web-based target.

3. The method of claim 1, wherein the network resource includes a server computer.

4. The method of claim 1, further comprising:
based on information indicating that the credit value usable for the user to use the network-based product or service is lower than the debit amount, the computer-based device denying the request; and
the computer-based device notifying the user, via a networked connection, that additional credit value associated with network traffic to the designated web-based target should be generated.

5. The method of claim 1, further comprising:
the computer-based device causing the state information to be updated subsequent to the computer-based device granting the request to use the network-based product or service.

6. The method of claim 1, wherein the network-based product or service includes a web-based application software.

7. The method of claim 1, wherein the credit value is based on a type of action associated with the network traffic generated by the user.

8. The method of claim 1, further comprising:
based on information indicating that the network traffic to the designated web-based target includes a web-based transaction, the computer-based device calculating the credit value based on the web-based transaction.

9. The method of claim 1, further comprising:
upon detecting that the link has been selected, the computer-based device calculating the credit value based on a multiplier corresponding to the link.

10. A computing system, comprising:
a processor; and
one or more memories that are configured to communicate with the processor, the one or more memories having instructions stored thereon that are executable by the processor in order to cause the computing system to perform operations comprising:
receiving data encoding state information from a network-based product or service, wherein the network-based product or service is in networked communication with the computing system, wherein the network-based product or service corresponds to a network resource for a web page or web site, and wherein the state information is indicative of a usage of the network-based product or service by a user;
receiving a request from the user to use the network-based product or service, wherein the request is associated with a debit amount for the use of the network-based product or service;
receiving network traffic information indicative of network traffic generated by the user to a designated web-based target;
in response to receiving the network traffic information and based on the state information, calculating a credit value associated with the network traffic information, wherein the credit value is usable in exchange for the use of the network-based product or service; and
permitting the request to use the network-based product or service, based on an exchange of at least a portion of the credit value for at least a portion of the debit amount.

11. The computing system of claim 10, wherein the operations further comprise:
incorporating source code for a link into a particular website, wherein the link is selectable by the user to navigate to the designated web-based target.

12. The computing system of claim 10, wherein the operations further comprise:
receiving the network traffic information from a sponsor of the network-based product or service;
based on the network traffic information, applying a conversion factor to the network traffic to calculate the credit value; and
deducting, from an account of the user, the portion of the credit value in exchange for permitting the request to use the network-based product or service.

13. The computing system of claim 10, wherein the operations further comprise:
prior to the permitting, notifying the user that additional network traffic to the designated web-based target should be generated based on information indicating that the credit value is less than a threshold value; and
modifying a particular website to include an additional link selectable by the user to navigate to the designated web-based target or a different designated web-based target.

14. The computing system of claim 10, wherein the operations further comprise:
based on the network traffic information, determining that the network traffic generated by the user includes a type of action performed at the designated web-based target; and
calculating the credit value based on the type of action.

15. An article of manufacture including a non-transitory computer-readable medium having instructions stored thereon that are executable by a computing system to cause the computing system to perform operations comprising:
- receiving data encoding state information from a network-based product or service, wherein the network-based product or service is in networked communication with the computing system, wherein the network-based product or service corresponds to a network resource for a web page or web site, and wherein the state information is indicative of a usage of the network-based product or service by a user;
- receiving a request of the user to use the network-based product or service, wherein the request is associated with a debit amount for the use of the network-based product or service;
- receiving network traffic information indicative of network traffic generated by the user to a designated web-based target;
- calculating a credit value associated with the network traffic information, wherein the credit value is usable in exchange for the use of the network-based product or service; and
- determining whether to permit the request to use the network-based product or service by the user based on an exchange of at least a portion of the credit value for at least a portion of the debit amount.

16. The article of manufacture of claim 15, wherein the operations further comprise:
- upon permitting the request, causing the state information to be updated based on a value, the value being the credit value reduced by the debit amount.

17. The article of manufacture of claim 15, wherein the operations further comprise:
- communicating, via a networked connection, with a computer device having a hardware component configured to display the network-based product or service to the user; and
- wherein the request is received based on the communicating.

18. The article of manufacture of claim 15, wherein the operations further comprise:
- based on comparison information indicating that the credit value is lower than the debit amount, transmitting a payment request to the user for the request to use the network-based product or service; and
- upon receiving a payment from the user, permitting the request to use the network-based product or service.

19. The article of manufacture of claim 15, wherein the operations further comprise:
- based on the credit value, increasing a credit balance of an account of the user from a first balance to a second balance;
- based on balance information indicating that the second balance is larger than the debit amount, permitting the request to use the network-based product or service; and
- decreasing the second balance by the debit amount and causing the state information to be updated based on permitting the request.

20. The article of manufacture of claim 15, wherein the operations further comprise:
- comparing the credit value a threshold amount; and
- based on a result of the comparing, wherein the result indicates that the credit value is below the threshold value, providing the user with an option to generate additional network traffic to the designated web-based target or to transmit a payment for the use.

* * * * *